United States Patent [19]

Yamamoto et al.

[11] Patent Number: 5,062,983

[45] Date of Patent: Nov. 5, 1991

[54] MAGNETIC POWDER FOR MAGNETIC RECORDING MEDIA

[75] Inventors: Haruhisa Yamamoto, Yokohama; Hidenobu Urata, Kamakura; Tatsuo Kinebuchi, Tokyo; Hidenori Sawabe, Yokohama, all of Japan

[73] Assignee: Nippon Zeon Co., Ltd., Japan

[21] Appl. No.: 516,593

[22] Filed: Apr. 30, 1990

[30] Foreign Application Priority Data

May 11, 1989 [JP] Japan .................................. 1-116069

[51] Int. Cl.$^5$ ............................................. C04B 35/26
[52] U.S. Cl. ............................... 252/62.57; 252/62.58; 252/62.59; 252/62.6; 252/62.62; 252/62.63; 252/62.64; 428/694; 428/900
[58] Field of Search ................ 252/62.56, 62.57, 62.58, 252/62.59, 62.6, 62.62, 62.63, 62.64; 428/692, 694, 328, 329, 900

[56] References Cited

U.S. PATENT DOCUMENTS

| | | | |
|---|---|---|---|
| 4,341,648 | 7/1982 | Kubo et al. | 252/62.63 |
| 4,529,524 | 7/1985 | Nagai et al. | 252/62.59 |
| 4,551,260 | 11/1985 | Hayakawa et al. | 252/62.59 |
| 4,585,568 | 4/1986 | Nagai et al. | 252/62.59 |
| 4,636,433 | 1/1987 | Kubo et al. | 252/62.59 |
| 4,770,933 | 9/1988 | Kitahata et al. | 252/62.59 |
| 4,789,494 | 12/1988 | Aoki et al. | 252/62.59 |
| 4,820,433 | 4/1989 | Yamamoto et al. | 252/62.59 |
| 4,828,916 | 5/1989 | Yamamoto et al. | 252/62.59 |
| 4,886,714 | 12/1989 | Torii et al. | 252/62.59 |

FOREIGN PATENT DOCUMENTS

| | | | |
|---|---|---|---|
| 86103 | 6/1980 | Japan . | |
| 157718 | 8/1985 | Japan . | |
| 168532 | 7/1986 | Japan . | |
| 174118 | 8/1986 | Japan . | |
| 219720 | 9/1986 | Japan . | |
| 295236 | 12/1986 | Japan . | |
| 62-107436 | 5/1987 | Japan | 252/62.59 |
| 207720 | 9/1987 | Japan . | |
| 216922 | 9/1987 | Japan . | |
| 235220 | 10/1987 | Japan . | |
| 64626 | 3/1988 | Japan . | |
| 63-185003 | 7/1988 | Japan | 252/62.59 |
| 193504 | 8/1988 | Japan . | |
| 193506 | 8/1988 | Japan . | |
| 193507 | 8/1988 | Japan . | |
| 310729 | 12/1988 | Japan . | |
| 1-119517 | 5/1989 | Japan | 252/62.59 |
| 1-1119516 | 5/1989 | Japan | 252/62.59 |

OTHER PUBLICATIONS

Tadashi Ido et al., "Barium Ferrite Fine Particles for Perpendicular Magnetic Recording Media" Toshiba Review, No. 154, Winter 1985, pp. 10–13.

*Primary Examiner*—Jack Cooper
*Attorney, Agent, or Firm*—Lowe, Price, LeBlanc & Becker

[57] ABSTRACT

A magnetic powder for magnetic recording media, which has an average particle diameter of at most 0.08 μm and a ratio of the maximum diameter to the maximum thickness of at most 8 and is represented by the following general composition formula:

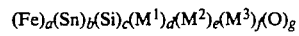

$$(Fe)_a(Sn)_b(Si)_c(M^1)_d(M^2)_e(M^3)_f(O)_g$$

wherein $M^1$ means at least one metal element selected from Ba, Sr, Ca and Pb, $M^2$ denotes at least one metal element selected from Cr, Y, Ce, Nd, Sm, Al, La and Cd, $M^3$ stands for at least one metal element selected from Mg, Ti, Mn, Ni, Cu, Zn, Sb, In, Mo and W, a, b, c, d, e, f and g respectively represent the numbers of Fe, Sn, Si, $M^1$, $M^2$, $M^3$ and O atoms, a is a number of 8.0 to 12.0, b is a number of 0.01 to 6.0, c is a number of 0.05 to 6.0, d is a number of 0.3 to 6.0, e is a number of 0.01 to 6.0, and f is a number of 0.0 to 6.0, and g is the number of oxygen atoms satisfying the atomic valences of the other elements.

5 Claims, No Drawings

MAGNETIC POWDER FOR MAGNETIC RECORDING MEDIA

FIELD OF THE INVENTION

This invention relates to a magnetic powder for magnetic recording media. More specifically, this invention is concerned with a hexagonal ferrite magnetic powder composed of fine particles suitable for use in high-density magnetic recording media. From the magnetic powder according to this invention, magnetic recording media having a desired coercive force can be obtained with high precision.

BACKGROUND OF THE INVENTION

With a demand for higher density in magnetic recording in recent years, the perpendicular magnetic recording method by which a magnetic field is recorded in the thicknesswise direction of a magnetic recording medium has attracted a great deal of attention. The magnetic material used in the perpendicular magnetic recording method must have an easy axis of magnetization in a direction perpendicular to the surface of the recording medium.

Hexagonal ferrites having uniaxial magnetocrystalline anisotropy, for example, barium ferrite ($BaFe_{12}O_{19}$) magnetic powder, are hexagonal plate crystals, and have an easy axis of magnetization in a direction perpendicular to the plate surface. The plate surface of such a magnetic powder hence tend to become parallel to the surface of a substrate by the mere coating of it. Since its easy axis of magnetization orients in a direction perpendicular to the substrate surface with ease by a magnetic orientation treatment or mechanical orientation treatment, it is suitable for use as a magnetic material for coating film type perpendicular magnetic recording media.

The magnetic materials for the coating film type perpendicular magnetic media must satisfy the following requirements in addition to the fact that they are of a hexagonal system and have uniaxial magnetocrystalline anisotropy.

Namely, in order to conduct recording, reproducing and erasing to magnetic recording media such as magnetic tapes and floppy disks by a magnetic head, the magnetic powder generally must have a moderate coercive force, Hc, of usually about 200 to 2,000 Oe and the highest possible saturation magnetization, τs, of at least 40 emu/g. In addition, its average particle diameter must be at most 0.3 μm in view of recording wavelength and at least 0.01 μm in view of super paramagnetism. Within this range, at most 0 1 μm is preferred in view of noises. Furthermore, it is important to permit provision of high power when it is used as a magnetic recording medium. Therefore, it is preferable for the magnetic powder to have good dispersibility. The dispersibility of a magnetic powder in a magnetic recording medium depends on the shape and surface quality of the magnetic powder, the interaction between the magnetic powder and a resin binder used, etc. It is hence impossible to determine by its shape only whether its dispersibility is good or poor. For this reason, the dispersibility is generally evaluated by mixing the magnetic powder with the resin binder to produce a magnetic recording medium and measuring the glossiness of the surface of the magnetic recording medium. It is therefore desirable that the magnetic powder has high glossiness as a magnetic recording medium.

However, hexagonal barium ferrite ($BaFe_{12}O_{19}$) magnetic powder known generally has a coercive force of about 5,000 Oe which is too large for a magnetic material for magnetic recording media. Hence, it has been proposed heretofore to reduce the coercive force by substituting a substituting element such as cobalt (Co) for part of the constituent elements of the barium ferrite (for example, U.S. Pat. Nos. 4,341,648 and 4,585,568). According to these methods, the coercive force of the hexagonal barium ferrite magnetic powder can be reduced to a coercive force suitable for use as magnetic recording media by controlling the amount of Co substituted (for example, Japanese Patent Application Laid-Open No. 86103/1980).

The Co-containing hexagonal barium ferrite magnetic powders whose coercive forces have been controlled by the substitution of Co are however accompanied by a problem that when they are used for magnetic recording media, their coercive forces vary to a great extent. For example, the coercive forces of the Co-substituted hexagonal barium ferrite magnetic powders where they have been used as magnetic recording media increase to about at least 1.1 times, and sometimes, about 2.0 times the coercive forces of their corresponding raw magnetic powders used, as shown in Table 1.

TABLE 1

| JPO | Co-containing hexagonal barium ferrite magnetic powder | Coercive force of magnetic powder, Hc (Oe) | Coercive force of magnetic recording medium, Hc (Oe) | Hc of Tape/ Hc of magnetic powder |
|---|---|---|---|---|
| 157718/85 | $Ba_{1.0}Fe_{8.0}Co_{0.40}$ | 1110 | 1210 | 1.09 |
| 168532/86 | $Ba_{1.0}Fe_{10.4}Co_{0.80}Ti_{0.80}$ | 845 | 925 | 1.09 |
| 207720/87 | $Ba_{1.0}Fe_{5.73}Co_{0.42}Ti_{0.42}Si_{0.1}$ | 515 | 652 | 1.27 |
| 216922/87 | $Ba_{1.0}Fe_{10.2}Co_{0.9}Ti_{0.45}Sn_{0.45}$ | 550 | 800 | 1.45 |
| 235220/87 | $Ba_{1.0}Fe_{6.93}Co_{0.53}Ti_{0.53}$ | 1310 | 1450 | 1.11 |
| 64626/88 | Co-substituted barium ferrite | 550 | 620 | 1.13 |

Note: JPO stands for Japanese Patent Application Laid-Open No.

As shown in Table 1, the coercive forces of the hexagonal barium ferrite magnetic powders containing the elements substituted generally vary when they are formed into magnetic recording media. However, the variation tolerance in coercive force of a magnetic recording medium to be produced must be within (the preset value ±20) Oe, preferably, (the preset value ±10) Oe from the requirements in performance such as output and noises. For this reason, in order to produce a magnetic recording medium having a coercive force of a desired preset value with high precision within (the preset value ±20) Oe, preferably, (the preset value ±10) Oe, it is necessary to make an accurate forecast of a relation between the coercive force of a magnetic powder used and the coercive force of the magnetic recording medium produced therefrom, and to produce and use a magnetic powder having the same coercive force as the forecast value.

This will be described specifically by the magnetic powder in Japanese Patent Application Laid-Open No. 207720/1987, which has been shown in Table 1, as an example. In order to produce a magnetic tape having a preset coercive force of 650 Oe with precision of ±20 Oe, it is necessary to accurately produce a Co-substituted hexagonal barium ferrite magnetic powder having a coercive force of 512 ±15 Oe in advance.

Although the coercive force of the Co-containing hexagonal barium ferrite magnetic powders can be controlled by changing the content of Co, the coercive force of a resulting magnetic powder considerably varies depending upon changes in content of Co even when the amount changed is extremely small (Nikkei New Material, the April 28, 1986 issue, p. 52). Also, its coercive force considerably varies depending upon slight changes in conditions of the production process. It is hence very difficult to produce stably a magnetic powder having a desired coercive force within the limited tolerance as described above.

Furthermore, even if a magnetic powder having a desired coercive force can be produced, it is necessary to control the process so as to prevent the coercive force from varying to a great extent upon the production of a magnetic recording medium from the magnetic powder. However, in the case of the Co-containing hexagonal barium ferrite magnetic powder, its coercive force tends to vary greatly upon the production of the magnetic recording medium depending upon the water content, surface ion density and degree of dispersion of the magnetic powder, or the changes of conditions in the production process of the magnetic recording medium. It is hence extremely difficult to produce a magnetic recording medium having the same coercive force as a preset value with high precision.

On the other hand, various propositions have been made with respect to Co-free barium ferrite magnetic powder for high-density magnetic recording media.

For example, Sn-containing barium ferrite magnetic powder making use of tin (Sn) as a substituent element have been known. These magnetic powders are small in the temperature dependence of coercive force. However, the known Co-free and Sn-containing barium ferrite magnetic powders involve defects that since they generally have an average particle diameter as great as at least 0.085 μm, it is insufficient to make a resulting magnetic recording medium high density, that since their ratio of the maximum diameter to the maximum thickness (hereinafter refer to as the "plate ratio") is as great as at least 10, no high charging rate is attained in a coating medium [for example, Toshiba Review, 40 (13), (1985)], that they are wide in particle size distribution, that since it is difficult to reduce their coercive forces to 1,000 Oe or lower, they cannot be used as magnetic powders for magnetic recording media for which a low coercive force (200–900 Oe) is required, that their saturation magnetization is relatively low, and moreover that since they are poor in dispersibility, no high power can be provided when used as magnetic recording media.

For example, the Co-free and Sn-containing barium ferrite magnetic powders proposed in Japanese Patent Application Laid-Open Nos. 122726/1985 and 174118/1986 are accompanied by defects that the average particle diameter is at least 0.2 μm, the plate ratio is as high as at least 10 and the saturation magnetization is low. With respect to the Co-free and Sn-containing barium ferrite magnetic powder proposed in Japanese Patent Application Laid-Open No. 219720/1986, its coercive force can be reduced to an extent as low as 1,000 Oe or lower, but involves defects that both average particle diameter and plate ratio are as great as at least 0.1 μm and at least 10 respectively.

Although the Co-free and Sn-containing barium ferrite magnetic powder proposed in Japanese Patent Application Laid-Open No. 295236/1986 has merits that the average particle diameter is small and the coercive force is also low, it involves defects that the plate ratio is great and the saturation magnetization is as low as at most 52 emu/g.

The Co-free and Sn-containing barium ferrite magnetic powders proposed in Japanese Patent Application Laid-Open Nos. 193504/1988, 193506/1988 and 193507/1988 are all small in average particle diameter, but involve defects that they are wide in particle size distribution, and since it is difficult to reduce their coercive forces to 1,000 Oe or lower, they cannot be used as magnetic powders for magnetic recording media for which a coercive force as low as 200–900 Oe is required.

In addition, although the Co-free and Sn-containing barium ferrite magnetic powder proposed in Japanese Patent Application Laid-Open No. 310729/1988 has merits that the average particle diameter is small, the saturation magnetization is high and the coercive force is also low, both average particle diameter and plate ratio are great and the dispersibility is poor. It is not preferred to use it as a magnetic powder for magnetic recording media.

As has been described above, the barium ferrite magnetic powders, which are free of Co and contain Sn, are insufficient in performance as the magnetic powders for high-density magnetic recording media.

SUMMARY OF THE INVENTION

It is an object of this invention is to provide a magnetic powder which shows little variations in coercive force when used for magnetic recording media such as magnetic tapes and has excellent physical properties.

Another object of this invention is to provide a hexagonal ferrite magnetic powder in which the coercive force can be controlled to a range suitable for use in magnetic recording media, the saturation magnetization is high, the average particle diameter is small, the particle size distribution is even, the plate ratio is small and the dispersibility is excellent.

A further object of this invention is to provide magnetic recording media making use of the magnetic powder having excellent physical properties as described above.

The present inventors have carried out an extensive investigation with a view toward solving the problems involved in the above-mentioned prior art. As a result, it has been found that a hexagonal ferrite magnetic powder having a specific composition, which is free of Co as a substituent element and contains Sn, Si and specific metal elements, has excellent physical properties capable of attaining the above-described objects. Based on such a finding, the present invention has been led to completion.

Thus, according to this invention, there is provided a magnetic powder for magnetic recording media, which has an average particle diameter of at most 0.08 μm and a ratio of the maximum diameter to the maximum thickness (the plate ratio) of at most 8, and is represented by the following general composition formula:

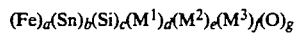

wherein $M^1$ means at least one metal element selected from Ba, Sr, Ca and Pb, $M^2$ denotes at least one metal element selected from Cr, Y, Ce, Nd, Sm, Al, La and Cd, $M^3$ stands for at least one metal element selected from Mg, Ti, Mn, Ni, Cu, Zn, Sb, In, Mo and W, a, b, c, d, e, f and g respectively represent the numbers of Fe, Sn, Si, $M^1$, $M^2$, $M^3$ and O atoms, a is a number of 8.0 to 12.0, b is a number of 0.01 to 6.0, c is a number of 0.05 to 6.0, d is a number of 0.3 to 6.0, e is a number of 0.01 to 6.0, and f is a number of 0.0 to 6.0, and g is the number of oxygen atoms satisfying the atomic valences of the other elements.

In the general formula, a magnetic powder better in particle size distribution can be obtained by adding the $M^3$ component within a range of 0.01–6.0.

In addition, a magnetic recording medium having a desired coercive force can be stably produced with high precision by using the magnetic powder for magnetic recording media according to this invention.

The magnetic powder according to this invention features that the coercive force can be preset to a desired value within a range of 200–2,000 Oe by controlling the kinds and proportions of the individual constituent elements and the like, the coercive force of a magnetic recording medium produced therefrom is almost the same as that of the magnetic powder as a raw material, and a magnetic recording medium having a desired preset coercive force can be obtained with high precision because of its little variation in coercive force. In addition, the magnetic powder of this invention has a saturation magnetization as high as at least 55 emu/g, an average particle diameter of at most 0.08 μm, a plate ratio of at most 8, even particle size distribution and excellent dispersibility. The magnetic powder hence has excellent physical properties as a magnetic powder for magnetic recording media.

DETAILED DESCRIPTION OF THE INVENTION

Features of the present invention will hereinafter be described in detail.

Composition

The magnetic powder according to this invention is a substituted hexagonal ferrite having the composition represented by the above-described general composition formula.

It is critical in this invention that the numbers a to g of the individual constituent elements of the magnetic powder should be within the above-specific ranges. If these numbers are outside the specific ranges, it is difficult to obtain a magnetic powder having coercive force and saturation magnetization suitable for magnetic recording media and an average particle diameter of at most 0.08 μm.

A preferred magnetic powder has such a composition that a is 8.0 to 12.0, b is 0.02 to 4.0, c is 0.1 to 4.0, d is 0.3 to 4.0, e is 0.02 to 4.0 and f is 0 to 5.5 and g is the number of oxygen atoms satisfying the atomic valences of the other elements in the general composition formula.

$M^3$ is selected from the above-specified metal elements. Among others, Mn, Ni, Cu, Zn, Mg and combinations thereof are preferred.

Depending upon manufacturing conditions and/or the like, the magnetic powder of this invention may contain particles which are not regular hexagonal plate crystals. However, the resulting magnetic powder can be suitably used as a magnetic powder according to this invention so long as it satisfies the above-described general composition formula.

Production Method of Magnetic Powder

No particular limitation is imposed on the production method of the magnetic powder of this invention. The magnetic powder of this invention can be obtained by any suitable production method, for example, the coprecipitation method, the flux method, the glass crystallization method, the hydrothermal synthesis method or the like. Among these, the coprecipitation method is particularly preferred because the individual components can be mixed thoroughly, an even ferrite can be obtained and the formation of the ferrite can be conducted at a relatively low temperature.

The production of the magnetic powder according to this invention will hereinafter be described with reference to the coprecipitation method.

Starting compounds of the individual metal elements constituting the magnetic powder of this invention include, for example, oxides, oxyhydroxides, hydroxides, salts such as ammonium salts, nitrates, sulfates, carbonates, organic acid salts, halides and alkali metal salts, free acids, acid anhydrides and polyacids. Of these, water-soluble compounds are particularly preferred.

Preferably, the starting compound for each metal element is dissolved in water to form an aqueous solution. Where it is convenient to dissolve it in an alkaline aqueous solution, the following alkaline aqueous solutions may be used.

On the other hand, the alkaline component used in the alkaline aqueous solution may be a water-soluble compound. As examples of such a compound, may be mentioned alkali metal hydroxides and carbonates, ammonia and ammonium carbonate. Described specifically, the alkalies used are NaOH, $Na_2CO_3$, $NaHCO_3$, KOH, $K_2CO_3$, $NH_4OH$ and $(NH_4)_2CO_3$ by way of example. A combination of a hydroxide and a carbonate is especially preferred.

The aqueous metal ion solution and the alkaline aqueous solution are then mixed to form a coprecipitate at a pH of at least 5, preferably, at least 8. The resulting coprecipitate is washed with water and then separated by filtration. The resulting cake-like or slurry-like coprecipitate is dried and then fired at 600 to 1,100° C. for 10 minutes to 30 hours to obtain a hexagonal ferrite magnetic powder.

On the other hand, in the case where the coprecipitate is fired in the presence of a flux, a suitable amount of a water-soluble flux (for example, an alkali metal halide such as sodium chloride or potassium chloride, an alkaline earth metal halide such as barium chloride or strontium chloride, sodium sulfate, potassium sulfate, sodium nitrate, potassium nitrate or a mixture thereof) is added to the washed coprecipitate. Alternatively, the alkali salt formed by the coprecipitation may also be used as the flux. In this case, the pH of the mixture, which has been obtained from the aqueous metal ion solution and the alkaline aqueous solution and contains the coprecipitate and the alkali salt, is adjusted with hydrochloric acid or the like and the pH-adjusted mixture is collected by filtration and used, as is, without washing it with water. Water is then evaporated from the mixture of the coprecipitate and the flux. The residue is dried and then fired at 600–1,100° C. for 10 minutes to 30 hours. The water-soluble flux is washed out with water or an acid aqueous solution and the residue is collected by filtration. As required, the residue is further washed with water and then dried to obtain a hexagonal ferrite magnetic powder.

The magnetic powder of this invention can be applied onto a substrate by a conventional coating method making use of a resin binder to produce a magnetic recording medium such as a magnetic tape.

ADVANTAGES OF THE INVENTION

According to the present invention, the following advantages is brought about. Namely, when a magnetic recording medium is produced from the magnetic powder of this invention, variations in coercive force is extremely little, therefore, it is possible to stably produce a magnetic recording medium having a desired coercive force with high precision within (the preset value ±10 Oe). In addition, since the coercive force of the magnetic powder can be preset to a desired value within a range of 200–2,000 Oe, a magnetic powder having a coercive force fit for a general-purpose magnetic head can be obtained with ease. For this reason, a magnetic recording medium having a desired coercive force can be produced with high precision. Furthermore, since the magnetic powder of this invention is obtained in an average particle diameter as small as at most 0.08 μm, it is excellent as a magnetic material for providing high-density magnetic recording media. Since it can also be provided as a magnetic powder having a plate ratio as small as at most 8, particularly, 2-5, a high charging rate can be attained in a coating medium. In addition, the magnetic powder provided in accordance with the present invention is high in saturation magnetization and excellent in dispersibility.

These excellent properties are surprising advantages quite unpredictable from the conventionally-known Co-containing hexagonal ferrite magnetic powders or Sn-containing hexagonal ferrite magnetic powders.

EMBODIMENTS OF THE INVENTION

The present invention will hereinafter be described more specifically by the following Examples and Comparative Examples. However, it should be borne in mind that this invention is not limited to the following Examples only. <Measurements of physical properties and others>

Various physical properties and characteristics in the Examples and Comparative Examples were measured in accordance with the following methods.

Coercive force and saturation magnetization of magnetic powder

The coercive forces and saturation magnetizations in these examples were measured by using a vibrating sample magnetometer (VSM) at a maximum applied magnetic field of 10 KOe and a measuring temperature of 28° C.

Average particle diameter and plate ratio (the ratio of the maximum diameter to the maximum thickness)

The maximum diameters and maximum thicknesses of 400 particles were measured from a micrograph of the magnetic powder taken through a transmission-type electron microscope to calculate the average particle diameter and the ratio of the maximum diameter to the maximum thickness (the plate ratio) as arithmetic averages.

Particle size distribution ($\sigma$gd)

The above measurements of the particle diameters were arranged using the logarithmic normal distribution to determine the particle size distribution.

Coercive force and glossiness of magnetic sheet

A sample magnetic powder in an amount of 100 parts by weight was mixed thoroughly with 10 parts by weight of a binder for magnetic tape ("MR-110", trade name; product of Nippon Zeon Co., Ltd.) and a mixed solvent consisting of methyl ethyl ketone, toluene and cyclohexanone to prepare a magnetic coating formulation. The magnetic coating formulation was applied by a doctor blade onto a polyester film. The thus-coated polyester film was then dried to obtain a magnetic sheet. With the magnetic tapes thus obtained, the coercive force in a direction in-plane to the surface of the magnetic sheet was measured by using the vibrating sample magnetometer (VSM) at a maximum applied magnetic field of 5 KOe. In addition, its glossiness was measured by a glossmeter manufactured by Murakami Shikisai Kenkyusho at an incident angle of 60°.

Composition formula of magnetic powder

In the composition formula for each magnetic powder in these examples, the atomic ratio of the elements is expressed by that of the elements at the time of preparing the starting materials, and the indication of oxygen is omitted for simplification. EXAMPLE 1

$BaCl_2.2H_2O$ 0.28 mole, 0.153 mole of $SnCl_2.2H_2O$, 0.102 mole of $CdCl_2.2.5H_2O$ and 2.8 moles of $FeCl_3.6H_2O$ were dissolved in 2.5 liters of purified water to form an aqueous solution (designated A).

NaOH 8.0 moles, 2.2 moles of $Na_2CO_3$ and 0.051 mole of $Na_2SiO_3.9H_2O$ were dissolved in 2.5 liters of purified water to form an aqueous solution (designated B).

While holding both solutions A and B at 30° C., they were mixed with each other, followed by agitation at 30° C. for 10 hours. The thus-obtained mixture containing coprecipitate was added with 6,000 ml of 1N hydrochloric acid and 60 liters of purified water, followed by agitation at 30° C. for 10 hours. The mixture was then separated by filtration, and water was evaporated from the mixture, as is, to dryness. The residue was fired at 890° C. for 2.5 hours in an electric furnace. The resulting fired product was washed with purified water until no soluble material existed. Subsequent filtration and drying gave a ferrite magnetic powder.

The various properties of the resulting ferrite magnetic powder are shown in Table 2.

Examples 2-11

Ferrite magnetic powders shown in Table 2 were prepared by exactly the same method as in Example 1 except that the $M^1$ and $M^2$ components and the compositions were changed as shown in Table 2.

Incidentally, chlorides were used as starting materials for $M^1$ component. Starting materials for the $M^2$ component were chlorides for Cd and Cr, and nitrates for the other components.

As apparent from the Table 2, the magnetic powders according to this invention have each a moderate coercive force and hardly show variations in coercive force upon production of magnetic sheets therefrom. In addition, they exhibit excellent properties in all respects such as average particle diameter, particle size distribution plate ratio and dispersibility.

COMPARATIVE EXAMPLES 1-2

TABLE 2

| Ex. No. | Composition of magnetic powder (atomic ratio) | Properties of magnetic powder | | | | | Magnetic sheet | |
|---|---|---|---|---|---|---|---|---|
| | | Coercive force (Oe) | Saturation magnetization (emu/g) | Average particle diameter ($\mu$m) | Plate ratio | Particle size distribution ($\sigma$gd) | coercive force (Oe) | Glossiness (%) |
| 1 | $Ba_{1.1}Fe_{11.0}Sn_{0.6}Cd_{0.4}Si_{0.2}$ | 715 | 57.9 | 0.06 | 4.0 | 2.32 | 718 | 92 |
| 2 | $Ba_{1.1}Fe_{11.0}Sn_{0.5}Ce_{0.5}Si_{0.3}$ | 780 | 58.0 | 0.05 | 3.2 | 2.34 | 783 | 91 |
| 3 | $Ba_{1.1}Fe_{10.7}Sn_{0.75}Cr_{0.55}Si_{0.5}$ | 547 | 57.7 | 0.05 | 2.8 | 2.30 | 547 | 95 |
| 4 | $Ba_{1.1}Fe_{10.8}Sn_{0.5}Nd_{0.7}Si_{0.7}$ | 811 | 57.9 | 0.06 | 4.5 | 2.33 | 812 | 94 |
| 5 | $Ba_{1.1}Fe_{11.3}Sn_{0.4}Sm_{0.3}Si_{0.4}$ | 850 | 57.6 | 0.06 | 4.8 | 2.32 | 855 | 97 |
| 6 | $Ba_{1.1}Fe_{10.7}Sn_{0.8}La_{0.5}Si_{0.5}$ | 507 | 57.8 | 0.06 | 5.1 | 2.35 | 511 | 105 |
| 7 | $Ba_{1.0}Fe_{10.8}Sn_{0.25}Y_{0.95}Si_{0.8}$ | 769 | 57.5 | 0.05 | 3.7 | 2.31 | 770 | 95 |
| 8 | $Ba_{1.0}Fe_{10.5}Sn_{0.9}Al_{0.6}Si_{0.4}$ | 521 | 58.4 | 0.04 | 2.7 | 2.30 | 521 | 102 |
| 9 | $Ca_{1.0}Fe_{10.8}Sn_{0.7}Nd_{0.5}Si_{0.3}$ | 560 | 58.1 | 0.06 | 5.0 | 2.33 | 566 | 92 |
| 10 | $Sr_{1.0}Fe_{10.7}Sn_{0.6}Cr_{0.7}Si_{0.4}$ | 615 | 57.8 | 0.05 | 3.0 | 2.31 | 617 | 90 |
| 11 | $Pb_{1.0}Fe_{11.1}Sn_{0.5}Cd_{0.4}Si_{0.7}$ | 752 | 57.5 | 0.05 | 4.0 | 2.37 | 755 | 107 |

EXAMPLES 12-29

Ferrite magnetic powders shown in Table 3 were prepared by exactly the same method as in Example 1 except that the $M^2$ and $M^3$ components and the compositions were changed as shown in Table 3.

Incidentally, starting materials for $M^2$ component were chlorides for Cd and Cr, and nitrates for the other components. Starting materials for the $M^3$ component were chlorides for Ti, Zn, Sb and In, ammonium salts for Mo and W, and nitrates for the other components. The starting compounds for Mo and W were used as a solution in an alkaline aqueous solution.

As apparent from the Table 3, magnetic powders having more even particle size distribution can be provided by adding the $M^3$ component. In addition, these magnetic powders are excellent in all the physical properties.

Magnetic powders were prepared by exactly the same method as in Example 1 except that cobalt nitrate was used instead of cadmium chloride and sodium metasilicate.

The compositions and physical properties of the magnetic powder thus obtained are shown in Table 4.

COMPARATIVE EXAMPLES 3-8

Magnetic powders were prepared by exactly the same method as in Example 1 except that the compositions were changed to those corresponding to the compositions in Examples of Japanese Patent Application Laid-Open Nos. 295236/1986, 193504/1988, 193506/1988, 193507/1988 and 310729/1988.

The compositions and physical properties of the magnetic powders thus obtained are shown in Table 4.

It is understood from Table 4 that the magnetic powders in these comparative examples show considerable variations in coercive force upon production of magnetic sheets therefrom and are insufficient in performance as magnetic powder for high-density magnetic recording media.

TABLE 3

| Ex. No. | Composition of magnetic powder (atomic ratio) | Properties of magnetic powder | | | | | Magnetic sheet | |
|---|---|---|---|---|---|---|---|---|
| | | Coercive force (Oe) | Saturation magnetization (emu/g) | Average particle diameter ($\mu$m) | Plate ratio | Particle size distribution ($\sigma$gd) | coercive force (Oe) | Glossiness (%) |
| 12 | $Ba_{1.1}Fe_{10.9}Sn_{0.3}Cd_{0.5}Mn_{0.3}Si_{0.3}$ | 781 | 57.7 | 0.06 | 3.9 | 2.20 | 784 | 99 |
| 13 | $Ba_{1.1}Fe_{10.9}Sn_{0.5}Al_{0.4}Ni_{0.2}Si_{0.6}$ | 665 | 58.0 | 0.05 | 2.6 | 2.23 | 667 | 96 |
| 14 | $Ba_{1.1}Fe_{10.8}Sn_{0.3}La_{0.4}Mg_{0.5}Si_{0.4}$ | 732 | 57.5 | 0.06 | 3.5 | 2.21 | 735 | 96 |
| 15 | $Ba_{1.1}Fe_{11.0}Sn_{0.6}Ce_{0.3}Zn_{0.1}Si_{0.6}$ | 627 | 57.3 | 0.05 | 2.9 | 2.21 | 628 | 101 |
| 16 | $Ba_{1.1}Fe_{10.9}Sn_{0.4}Cr_{0.4}Cu_{0.3}Si_{0.3}$ | 709 | 57.5 | 0.06 | 4.1 | 2.19 | 709 | 95 |
| 17 | $Ba_{1.1}Fe_{10.8}Sn_{0.4}Nd_{0.2}Ti_{0.6}Si_{0.3}$ | 688 | 57.9 | 0.06 | 4.3 | 2.25 | 690 | 94 |
| 18 | $Ba_{1.1}Fe_{11.0}Sn_{0.4}Cd_{0.3}In_{0.3}Si_{0.7}$ | 650 | 57.2 | 0.05 | 3.2 | 2.23 | 655 | 96 |
| 19 | $Ba_{1.1}Fe_{10.9}Sn_{0.5}La_{0.2}Mo_{0.4}Si_{0.4}$ | 617 | 57.7 | 0.05 | 2.8 | 2.25 | 617 | 90 |
| 20 | $Ba_{1.1}Fe_{10.6}Sn_{1.0}Al_{0.2}Sb_{0.2}Si_{0.5}$ | 502 | 58.1 | 0.06 | 5.0 | 2.20 | 506 | 95 |
| 21 | $Ba_{1.1}Fe_{10.4}Sn_{1.2}Cd_{0.1}W_{0.3}Si_{0.9}$ | 456 | 57.9 | 0.04 | 2.6 | 2.21 | 460 | 95 |
| 22 | $Ba_{1.1}Fe_{10.7}Sn_{0.6}Sm_{0.3}Ni_{0.3}Cu_{0.1}Si_{0.6}$ | 606 | 58.0 | 0.05 | 3.4 | 2.18 | 608 | 107 |
| 23 | $Ba_{1.1}Fe_{10.7}Sn_{0.5}Cr_{0.4}Mn_{0.3}Mg_{0.1}Si_{0.3}$ | 635 | 57.5 | 0.06 | 4.9 | 2.18 | 639 | 94 |
| 24 | $Ba_{1.1}Fe_{10.8}Sn_{0.6}Al_{0.2}Zn_{0.2}Cu_{0.2}Si_{0.9}$ | 597 | 57.5 | 0.05 | 3.5 | 2.17 | 601 | 105 |
| 25 | $Ba_{1.1}Fe_{10.4}Sn_{1.1}Y_{0.3}Mg_{0.1}W_{0.1}Si_{0.5}$ | 483 | 57.9 | 0.06 | 5.0 | 2.20 | 485 | 97 |
| 26 | $Ba_{1.1}Fe_{10.3}Sn_{0.9}La_{0.3}Ni_{0.3}Zn_{0.2}Si_{0.2}$ | 496 | 58.2 | 0.05 | 3.8 | 2.18 | 500 | 94 |
| 27 | $Ba_{1.1}Fe_{10.6}Sn_{0.8}Cr_{0.4}Zn_{0.1}Mo_{0.1}Si_{0.8}$ | 513 | 57.5 | 0.05 | 3.5 | 2.22 | 513 | 103 |
| 28 | $Ba_{1.1}Fe_{10.4}Sn_{0.7}Cd_{0.6}Cu_{0.2}In_{0.1}Si_{0.3}$ | 641 | 58.0 | 0.06 | 4.1 | 2.23 | 643 | 96 |
| 29 | $Ba_{1.1}Fe_{10.5}Sn_{0.8}Al_{0.3}Mn_{0.2}Ni_{0.2}Si_{0.3}$ | 530 | 57.7 | 0.06 | 4.5 | 2.20 | 535 | 97 |

TABLE 4

| Comp. Ex. No. | Composition of magnetic powder (atomic ratio) | Coercive force (Oe) | Saturation magnetization (emu/g) | Average particle diameter (μm) | Plate ratio | Particle size distribution (σgd) | Magnetic sheet coercive force (Oe) | Glossiness (%) |
| --- | --- | --- | --- | --- | --- | --- | --- | --- |
| 1 | $Ba_{1.1}Fe_{10.8}Sn_{0.6}Co_{0.6}$ | 807 | 51.8 | 0.15 | 11.4 | 3.56 | 1097 | 32 |
| 2 | $Ba_{1.1}Fe_{10.9}Sn_{0.7}Co_{0.4}$ | 989 | 50.9 | 0.20 | 12.6 | 3.58 | 1275 | 36 |
| 3 | $Ba_{3.13}Fe_{10.91}Sn_{1.09}$ | 733 | 50.1 | 0.12 | 11.2 | 3.49 | 682 | 38 |
| 4 | $Ba_{3.13}Fe_{9.80}Sn_{0.98}Ni_{1.22}$ | 720 | 48.3 | 0.08 | 9.4 | 3.52 | 662 | 28 |
| 5 | $Ba_{1.0}Fe_{10.5}Zn_{0.9}Nb_{0.3}Sn_{0.3}$ | 1217 | 52.7 | 0.08 | 8.2 | 3.57 | 1143 | 43 |
| 6 | $Ba_{1.0}Fe_{10.3}Zn_{0.85}Zr_{0.55}Sn_{0.30}$ | 1120 | 51.9 | 0.08 | 8.3 | 3.59 | 1052 | 47 |
| 7 | $Ba_{1.0}Fe_{10.47}Zn_{1.0}W_{0.23}Sn_{0.30}$ | 1633 | 52.5 | 0.08 | 8.5 | 3.59 | 1470 | 45 |
| 8 | $Ba_{2.65}Fe_{9.18}Sn_{1.41}Ni_{1.41}$ | 789 | 55.8 | 0.09 | 10.1 | 3.17 | 742 | 25 |

EXAMPLE 30

$BaCl_2 \cdot 2H_2O$ 0.55 mole, 0.35 mole of $SnCl_2 \cdot 2H_2O$, 0.25 mole of $La(NO_3)_3 \cdot 6H_2O$ and 5.4 moles of $FeCl_3 \cdot 6H_2O$ were dissolved in 10 liters of distilled water in this sequence to form an aqueous solution A.

NaOH 17.5 moles, 4.72 moles of $Na_2CO_3$ and 0.175 mole of $Na_2SiO_3 \cdot 9H_2O$ were dissolved in 15 liters of distilled water at room temperature to form an aqueous solution B.

The solution B was gradually added to the solution A heated at 50° C., and the mixture was then stirred at 50° C. for 16 hours.

The thus-obtained coprecipitate was separated by filtration, washed thoroughly with water, dried at 150° C. and then fired at 900° C. for 2.5 hours in an electric furnace.

The ferrite magnetic powder thus obtained is represented by the following composition formula:

$$Ba_{1.1}Fe_{10.8}Sn_{0.7}La_{0.5}Si_{0.35}$$

The magnetic powder had a coercive force of 592 Oe, a saturation magnetization of 57.9 emu/g, an average particle diameter of 0.06 μm, a plate ratio of 4.5 and a particle size distribution (σgd) of 2.33. A magnetic sheet produced from the magnetic powder had a coercive force (in a direction in-plane to the surface of the sheet) of 596 Oe and a glossiness of 97%.

separated by filtration and washed with water. The resulting cake-like coprecipitate slurry was added with 400 g of NaCl as a flux, and after thorough mixing, water was evaporated from the mixture to dryness. The residue was fired at 910° C. for 2 hours in an electric furnace.

The resulting fired product was washed with water until no soluble material existed, and then separated by filtration and dried. The barium ferrite magnetic powder thus obtained is represented by the following composition formula:

$$Ba_{1.1}Fe_{10.65}Sn_{0.8}Cr_{0.55}Si_{0.3}$$

The magnetic powder had a coercive force of 516 Oe, a saturation magnetization of 58.5 emu/g, an average particle diameter of 0.06 μm, a plate ratio of 3.9 and a particle size distribution (σgd) of 2.31. A magnetic sheet produced from the magnetic powder had a coercive force (in a direction in-plane to the surface of the tape) of 518 Oe and a glossiness of 95%.

EXAMPLES 32-35

Barium ferrite magnetic powders shown in Table 5 were prepared by exactly the same method as in Example 31 except that the $M^2$ component, the compositions and the flux were changed as shown in Table 5.

Physical properties of the magnetic powders thus obtained are shown in Table 5.

TABLE 5

| Ex. No. | Composition of magnetic powder (atomic ratio) | Flux | Coercive force (Oe) | Saturation magnetization (emu/g) | Average particle diameter (μm) | Plate ratio | Particle size distribution (σgd) | Coercive force (Oe) | Glossiness (%) |
| --- | --- | --- | --- | --- | --- | --- | --- | --- | --- |
| 32 | $Ba_{1.1}Fe_{10.9}Sn_{0.6}Al_{0.5}Si_{0.7}$ | $Na_2SO_4$ 450 g | 693 | 58.0 | 0.06 | 5.0 | 2.33 | 695 | 91 |
| 33 | $Ba_{1.1}Fe_{10.7}Sn_{0.8}Cd_{0.5}Si_{0.3}$ | NaCl 250 g/$BaCl_2 2H_2O$ 200 g | 513 | 57.8 | 0.06 | 4.2 | 2.30 | 514 | 95 |
| 34 | $Ba_{1.1}Fe_{11.3}Sn_{0.4}Ce_{0.3}Si_{0.6}$ | NaCl 200 g/KCl 200 g | 798 | 57.8 | 0.06 | 4.3 | 2.31 | 802 | 101 |
| 35 | $Ba_{1.1}Fe_{11.0}Sn_{0.6}Nd_{0.4}Si_{0.4}$ | NaCl 250 g/$Na_2SO_4$ 250 g | 721 | 57.5 | 0.05 | 3.4 | 2.30 | 726 | 97 |

EXAMPLE 31

$BaCl_2 \cdot 2H_2O$ 0.55 mole, 0.4 mole of $SnCl_2 \cdot 2H_2O$, 0.275 mole of $CrCl_3 \cdot 6H_2O$ and 5.325 moles of $FeCl_3 \cdot 6H_2O$ were dissolved in 10 liters of distilled water in this sequence to form an aqueous solution A.

NaOH 17.5 moles, 4.72 moles of $Na_2CO_3$ and 0.15 mole of $Na_2SiO_3 \cdot 9H_2O$ were dissolved in 15 liters of distilled water at room temperature to obtain an aqueous solution B.

The solution B was gradually added to the solution A heated at 50° C., and the mixture was then stirred at 50° C. for 16 hours. The thus-obtained coprecipitate was

What is claimed is:

1. A hexagonal ferrite magnetic powder for magnetic recording media, which has an average particle diameter of at most 0.08 μm, a plate ratio of maximum diameter to maximum thickness of at most 8, a saturation magnetization of at least 55 emu/g and is represented by the following general composition formula:

$$(Fe)_a(Sn)_b(Si)_c(M^1)_d(M^2)_e(M^3)_f(O)_g$$

wherein $M^1$ means at least one metal element selected from Ba, Sr, Ca and Pb, $M^2$ denotes at least one metal element selected from Cr, Y, Ce, Nd, Sm, Al, La and Cd, $M^3$ stands for at least one metal element selected from Mg, Ti, Mn, Ni, Cu, Zn, Sb, In, Mo and W, a, b, c, d, e, f and g respectively represent the numbers of Fe, Sn, Si, $M^1$, $M^2$, $M^3$ and O atoms, a is a number of 8.0 to 12.0, b is a number of 0.01 to 6.0, c is a number of 0.05 to 6.0, d is a number of 0.3 to 6.0, e is a number of 0.01 to 6.0, and f is a number of 0.0 to 6.0, and g is the number of oxygen atoms satisfying the atomic valences of the other elements.

2. The magnetic powder of claim 1, wherein f is a number of 0.01 to 6.0.

3. The magnetic powder of claim 1, wherein a is a number of 8.0 to 12.0, b is a number of 0.02 to 4.0, c is a number of 0.1 to 4.0, d is a number of 0.3 to 4.0, e is a number of 0.02 to 4.0, and f is a number of 0 to 5.5, and g is the number of oxygen atoms satisfying the atomic valences of the other elements.

4. The magnetic powder of claim 1, wherein $M^3$ is at least one metal element selected from Mn, Ni, Cu, Zn and Mg.

5. A magnetic recording medium comprising the magnetic powder of claim 1.

* * * * *